United States Patent
Yan et al.

(10) Patent No.: US 11,288,616 B2
(45) Date of Patent: Mar. 29, 2022

(54) METHOD OF USING MACHINE LEARNING TO PREDICT PROBLEMATIC ACTIONS WITHIN AN ORGANIZATION

(71) Applicant: YVA.AI, INC., Menlo Park, CA (US)

(72) Inventors: David Yan, Portola Valley, CA (US); Victor Kuznetsov, Moscow (RU); Aleksandr Mertvetsov, Moscow (RU); Marina Chilingaryan, Berkeley, CA (US); Eric Pelletier, Menlo Park, CA (US)

(73) Assignee: YVA.AI, INC., Menlo Park, CA (US)

( * ) Notice: Subject to any disclaimer, the term of this patent is extended or adjusted under 35 U.S.C. 154(b) by 139 days.

(21) Appl. No.: 16/265,893

(22) Filed: Feb. 1, 2019

(65) Prior Publication Data
US 2019/0244152 A1 Aug. 8, 2019

Related U.S. Application Data

(60) Provisional application No. 62/625,943, filed on Feb. 2, 2018.

(51) Int. Cl.
*G06Q 10/06* (2012.01)
*G06N 20/00* (2019.01)

(52) U.S. Cl.
CPC ....... *G06Q 10/06398* (2013.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 2003/0172291 A1 | 9/2003 | Judge et al. | |
| 2005/0216331 A1* | 9/2005 | Ahrens | G06Q 10/06398 705/7.42 |
| 2005/0261957 A1* | 11/2005 | Fisher | G06Q 10/105 705/320 |
| 2008/0225870 A1* | 9/2008 | Sundstrom | G06Q 10/10 370/401 |
| 2011/0246907 A1* | 10/2011 | Wang | G06Q 10/10 715/751 |
| 2012/0204265 A1 | 8/2012 | Judge | |
| 2015/0269244 A1* | 9/2015 | Qamar | G06Q 10/06398 705/7.42 |
| 2016/0180291 A1* | 6/2016 | Beck | G06Q 10/1053 705/7.28 |

(Continued)

OTHER PUBLICATIONS

International Search Report and Written Opinion for International Application No. PCT/US2019/016542, 12 pages, dated Apr. 22, 2019.

*Primary Examiner* — Arif Ullah
(74) *Attorney, Agent, or Firm* — Lowenstein Sandler LLP

(57) ABSTRACT

A method to predict problematic actions in an organization, executed by a processing device, includes accessing stored employee-related data, such as at least one of emails, surveys, minutes, or records of conversations, identifying a subset of the employee-related data that is associated with an employee, and predicting, based on the subset of the employee-related data associated with the employee, at least one of a likelihood that the employee is engaged in an adverse relation with other employees or a likelihood that the employee is to resign from the organization within a period of time.

20 Claims, 6 Drawing Sheets

(56) References Cited

U.S. PATENT DOCUMENTS

2016/0292644 A1* 10/2016 Drakoulis ................ G09B 5/02
2017/0236081 A1*  8/2017 Grady Smith ....... G06Q 10/067
                                                      705/7.36
2017/0293847 A1   10/2017 Robertson et al.

* cited by examiner

METHOD OF USING MACHINE LEARNING TO PREDICT PROBLEMATIC ACTIONS WITHIN AN ORGANIZATION

RELATED APPLICATIONS

This application claims the benefit of U.S. Provisional Application No. 62/625,943, filed on Feb. 2, 2018, the entire contents of which is hereby incorporated by reference herein.

TECHNICAL FIELD

This disclosure generally relates to natural language processing (NLP), and more specifically to processing employee-related data using NLP to predict problematic issues within the employee's work environment.

BACKGROUND

The success of modern organizations is directly related to productivity of its employees. In turn, productivity depends on the environment of an employee and the nature of an employee's relations with other people, both inside and outside the organization. Positive environment and good relations facilitate cooperation and efficient problem solving. In contrast, conflicts decrease productivity and job satisfaction of the employees. Accordingly, the success of a typical company is directly correlated with the happiness and satisfaction levels of the company's workers. According to Gallup, only about ⅓ of employees of modern organizations are actively engaged, while the Glassdoor data shows a bell curve of engagement with an average grade of a C+(3.1 out of 5) for modern company workers. Quantum Workplace believes that workers engagement has reached its lowest level within the last eight years.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
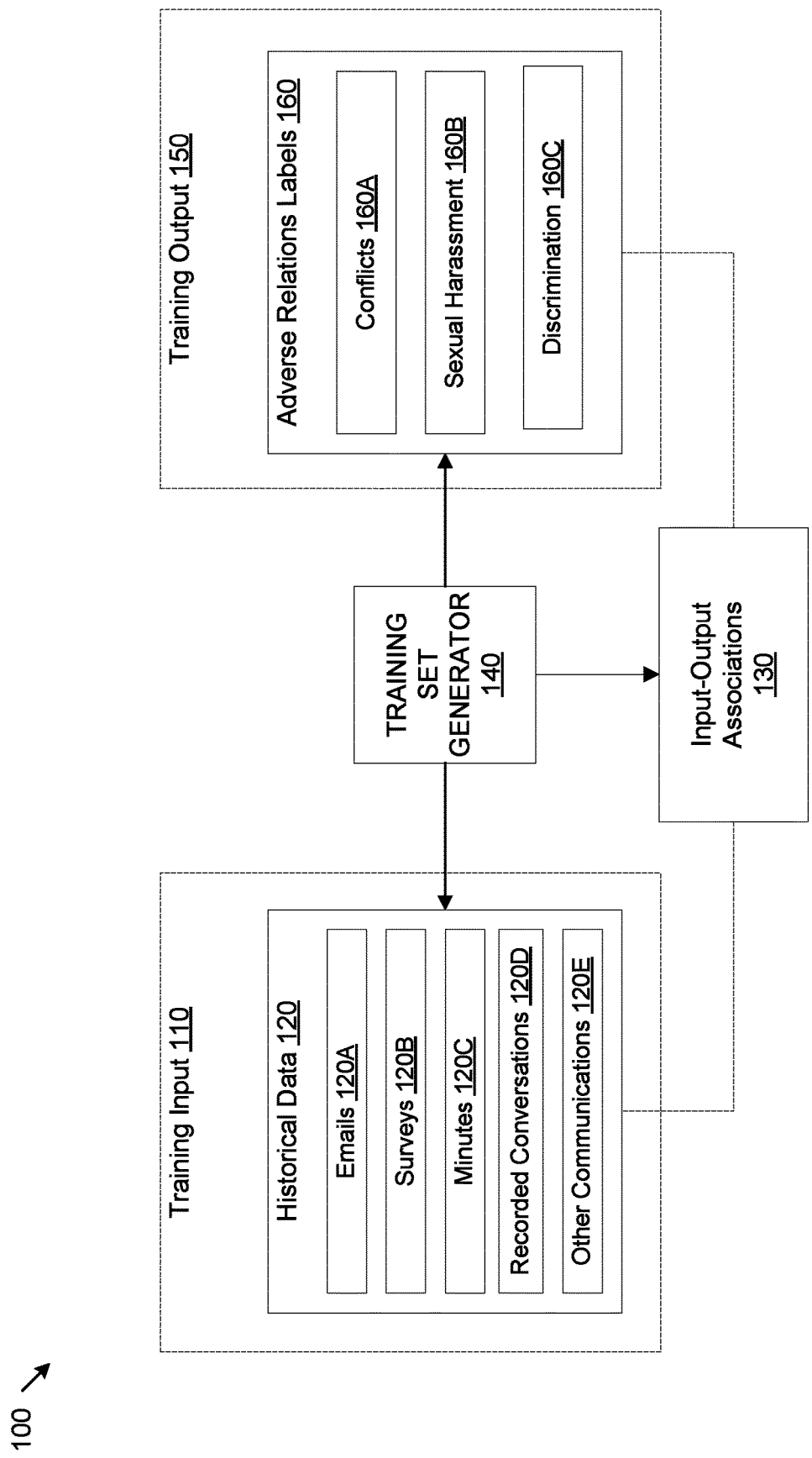
FIG. 1 schematically illustrates a training phase of an early detection model for detection of adverse relations, in accordance with one implementation.

Unsatisfied and disengaged workers are more likely to seek other employment and resign from the organization. Conflicts that employees become involved in or instances where employees are subjected to sexual harassment or other forms of hostile work environment or discrimination decrease employee job satisfaction. But such adverse relationships are often difficult to detect. Moreover, when finally detected, often at an advanced stage of the development, they require a lot of time and resources to be resolved, and often unsuccessfully. Timely (early) detection of adverse relationships and job dissatisfaction, therefore, becomes essential.

Aspects of the present disclosure are directed to predicting problematic issues within the employee's work environment to timely detect adverse relationships and job dissatisfaction. The predicting can be based on various structured and unstructured data concerning employees of an organization. Organizations nowadays own vast amounts of communication data in personal and corporate correspondence of their employees. Such data is constantly generated based on communications of employees. For example, employees may engage in email communications and recorded conversations, and participate in meetings where minutes are recorded. Employees can prepare presentations, with written materials distributed and oral talks recorded and transcribed. Employees may participate in digital discussion boards. Employees may produce correspondence with clients, customers, and external organizations, such as providers, suppliers, government entities. If used for the benefit of the organization and its employees, such data can help employee job satisfaction, facilitate avoidance of conflict, prevent instances of discrimination, and promote organization's development and growth.

In addition to the aforementioned unstructured data, employees may be directed to fill out surveys, questionnaires, and review requests or other types of structured data specifically designed to obtain feedback from/about employees. Examples include pulse surveys with questions for employees regarding their own personal experiences and thoughts, 360-degree surveys with questions to employees about their peers and colleagues. The structured data may include data derived from various management systems, such as CRM (Customer Relationship Management), Helpdesk, Salesforce, Zendesk, and various other systems.

Surveys or other types of structured data may reflect the general level of employee satisfaction or may have more specific goals of detecting instances of adverse relations, such as conflicts, sexual harassment, or other types of discrimination. By way of example, discrimination may include gender, sexual orientation, religious, national origin, age, disability, or any other discrimination prohibited by the employer policies and/or law. Surveys may be anonymous; they may have questions about specific employees, or employees belonging to a particular division of the organization, or may be directed at the organization as a whole. Surveys may be tailored to particular employees or be the same for a given groups of employees, or be uniform throughout the organization. Surveys may ask for feedback about supervisors, supervisees, projects the employee has been involved in, or any other job-related matters. Surveys might ask about matters not directly related to employment; for example, surveys may ask about employee relations with other employees outside the scope of their employment.

The collected unstructured and structured data may be stored in one or more data stores accessible to a computing system including one or more processing devices and hosted by one or more physical machines. The computing system may analyze the above data and generate a training data set to train a machine-learning model to predict the likelihood of a problematic action involving an employee of an organization. For example, the trained machine learning model may predict that an employee may be at risk of resignation, or that the employee can be presently involved, or at risk of becoming involved in an adverse relation in the future. The involvement in an adverse relation may include, for example, subjecting someone else to sexual harassment or other forms of discrimination, becoming a subject of sexual harassment or discrimination, or becoming aware of somebody being a subject of such adverse treatment.

The term "employee" should be broadly understood and may include someone employed by the organization full-time, part-time, or as an unpaid intern, a consultant, or any other person affiliated with the organization, such as a supplier or a contractor. An "employee" may also include a partner in a partnership, a member of an LLC, an officer or a director (board member) of a corporation, either disinterested or having a proprietary or financial interest in the corporation. The term "adverse relation" can include conflicts, instances of sexual harassment, prohibited discrimination, or any other interpersonal relations that are detrimental to the employer's objectives or employee productivity or job satisfaction.

Adverse relations can be evident from a sequence of communication acts, such as back-and-forth emails or text/voice messages, between the involved parties, in which the tension between the sides unfolds and increases gradually. The emergence of adverse relations can be predicted based on the analysis of historical conflicts in past communication data where the tension became clear and obvious in later stages of correspondence. The data from this stage is characterized by open expressions of annoyance, anger, offense, and threats. By detecting these evident factors of conflict in the later stages of communication and also supplied with the history of communication, a machine-learning model can learn what types of communications data associated with early stages of conflict development can predict future aggravation of the conflict. Likewise, the same approach can be used for early prediction of sexual harassment or discrimination, where the machine learning model can follow the same pattern of training as in the case of a conflict detection: the later stages of sexual harassment are often characterized by open expressions of assertion, coercion, and bullying and particular responses to such expressions. The computing system may receive the threads containing such messages in their entirety, and provide these threads to the machine learning model to allow it to identify trends in the development of harassment and to predict future issues by the earlier developments. Similarly, the machine-learning model can learn how to detect clues of discriminatory conduct, such as references to an employee's race, gender, notional origin, age, protected status, etc., and trace the frequency and offensiveness of such clues within a subset of employee-related data that is associated with the employee.

Aspects of the present disclosure can also relate to predicting likely resignations of an employee from the company. When an employee is considering to leave the company, the likelihood of leaving can be traced to (and detected from) the worker's communication pattern changes, including email response rate, his/her sentiments expressed in emails, the task completion speed, etc. The decision to leave the organization is usually accompanied by a noticeable decline in various engagement metrics, e.g., the volume of communication inside and outside of the workspace, the amount of meetings and conference calls the employee takes part in, the volume of tasks and assignments the employee assigns or receives, and other factors that can be extracted from structured and unstructured data. By evaluating the trends in such employee-generated or employee-relate electronic data, the machine-learning model can learn how to predict the probability of the employee resignation.

The machine learning model for early prediction of resignations and adverse employee relations may first be trained using historical data input, both unstructured, e.g., emails, records of communications, minutes, and structured, e.g., various kinds of surveys. Historical data may contain all or a desired subset of organization's data from any specified period of time depending on the predictive task. The specified period of time may be the lifetime of the organization or a particular period of its existence (e.g., last year, last month, last week, etc.).

FIG. 1 schematically illustrates a training phase 100 of an early detection model for detection of adverse relations, in accordance with one implementation. To train the machine-learning model to detect adverse employee relations, the training set generator 140 may generate an input, for example an email input 120A by accessing the storage of historical data 120 and retrieving an email message or a plurality of email messages sent and/or received by a particular employee. The training set generator 140 may further generate an output, such as an adverse relation label 160 to indicate that the employee became involved in an instance of personal conflict (a label of conflict 160A), an instance of sexual harassment (a label of sexual harassment 160B), or an instance of discrimination (a label of discrimination 160C). For example, the training set generator 140 may access and generate a training input corresponding to the very first identified email message in the email input 120A in the thread of messages leading to a known instance of an adverse relation. The training set generator 140 may further access and input all or some of the subsequent email messages in the same thread in the email input 120A. The training set generator may also access and generate an additional training input 110 corresponding to any other stored data relevant to the adverse relation output 160, such as surveys 120B, minutes of meetings 120C, recorded and transcribed conversations 120D, or any other recorded communication 120E that may exist, for example, records of online chats or electronic discussions. The training set generator 140 may further establish an input-output association between the training input and the corresponding target output. In establishing the input-output correspondence the training set generator may use algorithms of natural language processing. The training set generator may further store on any computer-readable medium the training set comprising the training input, the target output, and the input-output association. The training set may include a single adverse relation of employee A with employee B. The training set may include multiple adverse relations of employee A with employee B. For example, employee A may be both sexually harassing B and discriminating against B on the basis of national origin. Or B may be in conflict with A because A is discriminating against B on the basis of race or age. The training data may include adverse relations of employee A with multiple employees B, D, F, etc. Those adverse relations may be of the same type (e.g., A may be in conflict with those multiple employees) or different types (e.g., A may be in conflict with some while sexually harassing others). The training set may include adverse relations between multiple employees A, C, E . . . with multiple employees B, D, F . . . . The training set may include adverse relations that formed among more than two parties (for example, a conflict may exist between members of different units of the organization).

Figure 2:
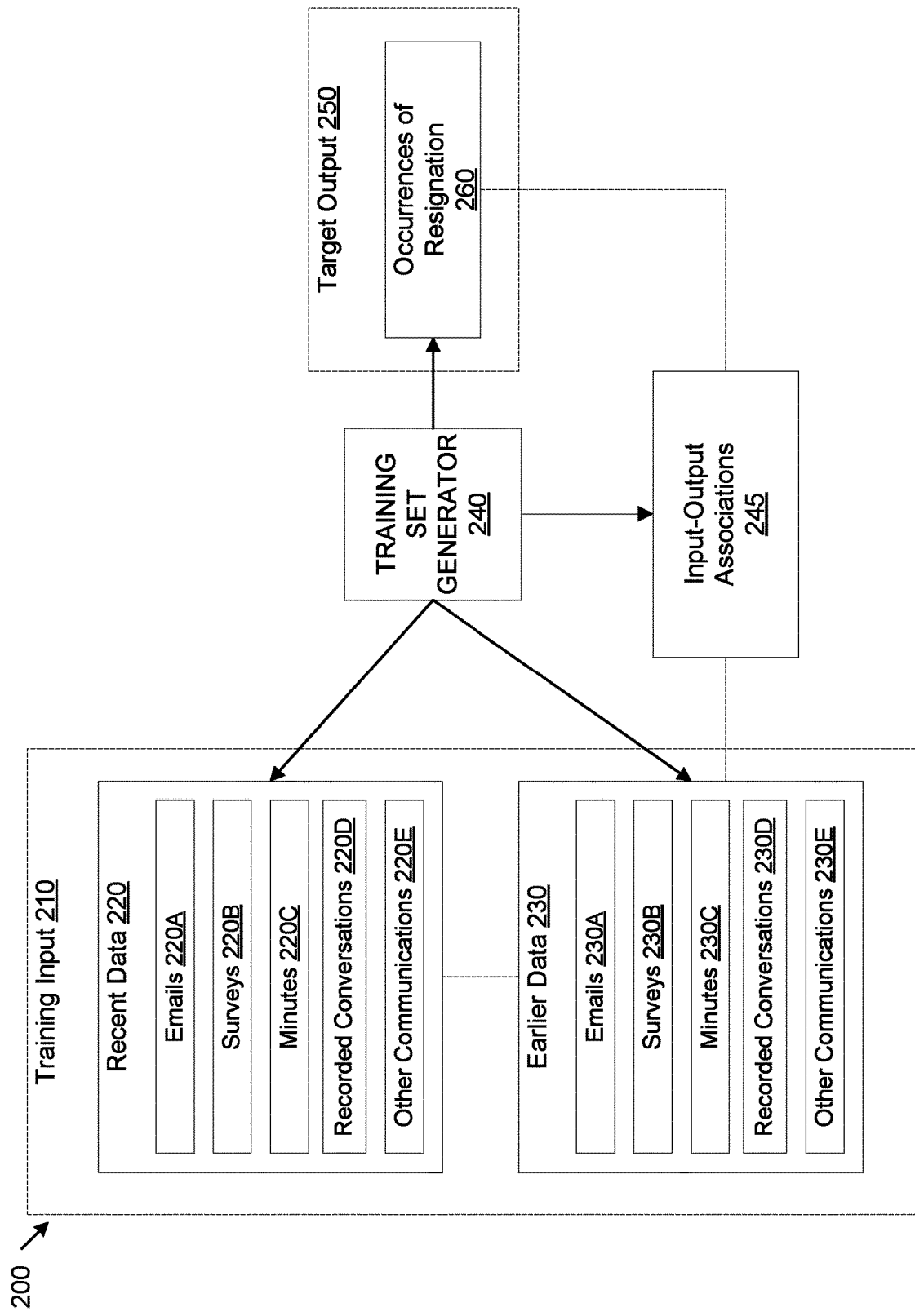
FIG. 2 schematically illustrates a training phase of an early detection model for detection of employee resignations, in accordance with one implementation.

FIG. 2 schematically illustrates a training phase 200 of an early detection model for detection of employee resignations, in accordance with one implementation. To train the machine-learning model to detect employee resignations, the training phase 200 may generate training sets for training the machine-learning algorithm (model) for early resignation detection. The training set generator 240 may generate a recent training input 220, for example by accessing a storage of historical data and retrieving recent employee-generated emails 220A, surveys 220B, minutes of meetings 220C, recorded conversations 220D, or any other recorded communications 220E, such as an online chat or electronic discussion. The training set generator 240 may further generate a training input 230 chronologically preceding the training input 220. For example, the survey input 220B may be the latest survey taken by the employee prior to resignation, whereas the input 230B may be a prior survey taken a year earlier. Alternatively, instead of surveys the training inputs 210 could be any employee-generated data produced at a plurality of times. The training set generator 240 may then generate a target output 250, such as an occurrence of resignation 260. The training set generator 240 may further establish input-output associations 245 between training inputs 220 and/or 230 and the corresponding target output 250. In establishing the input-output associations 245, the training set generator may use algorithms of natural language processing. The training set generator 240 may further store the training set comprising the training input, the target output of resignation, and the input-output association on the computer-readable storage medium (not shown).

Figure 3:
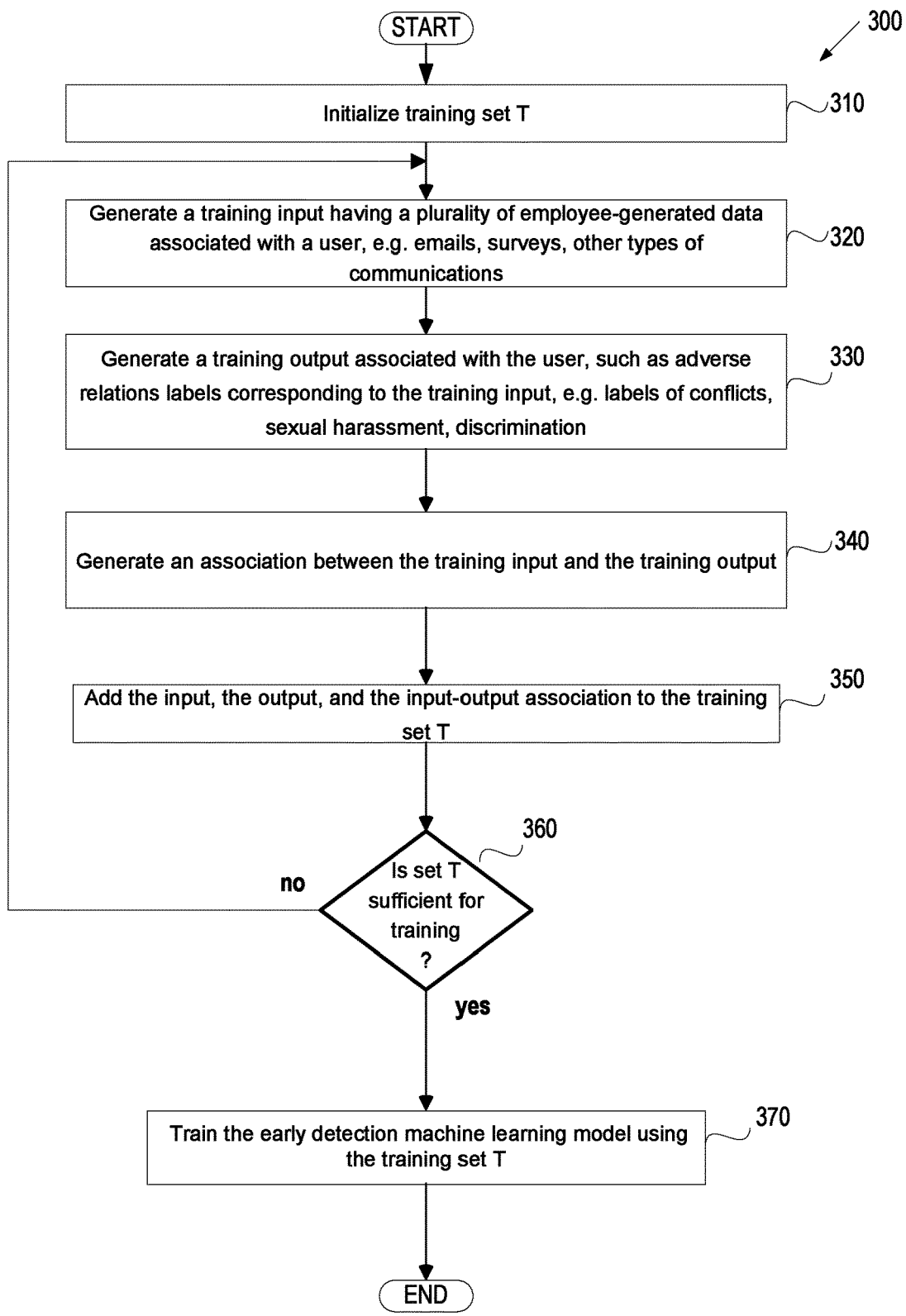
FIG. 3 depicts a flow diagram of an example method of training a machine-learning model for early detection of adverse relations and employee resignations using a training set.
Figure 4:
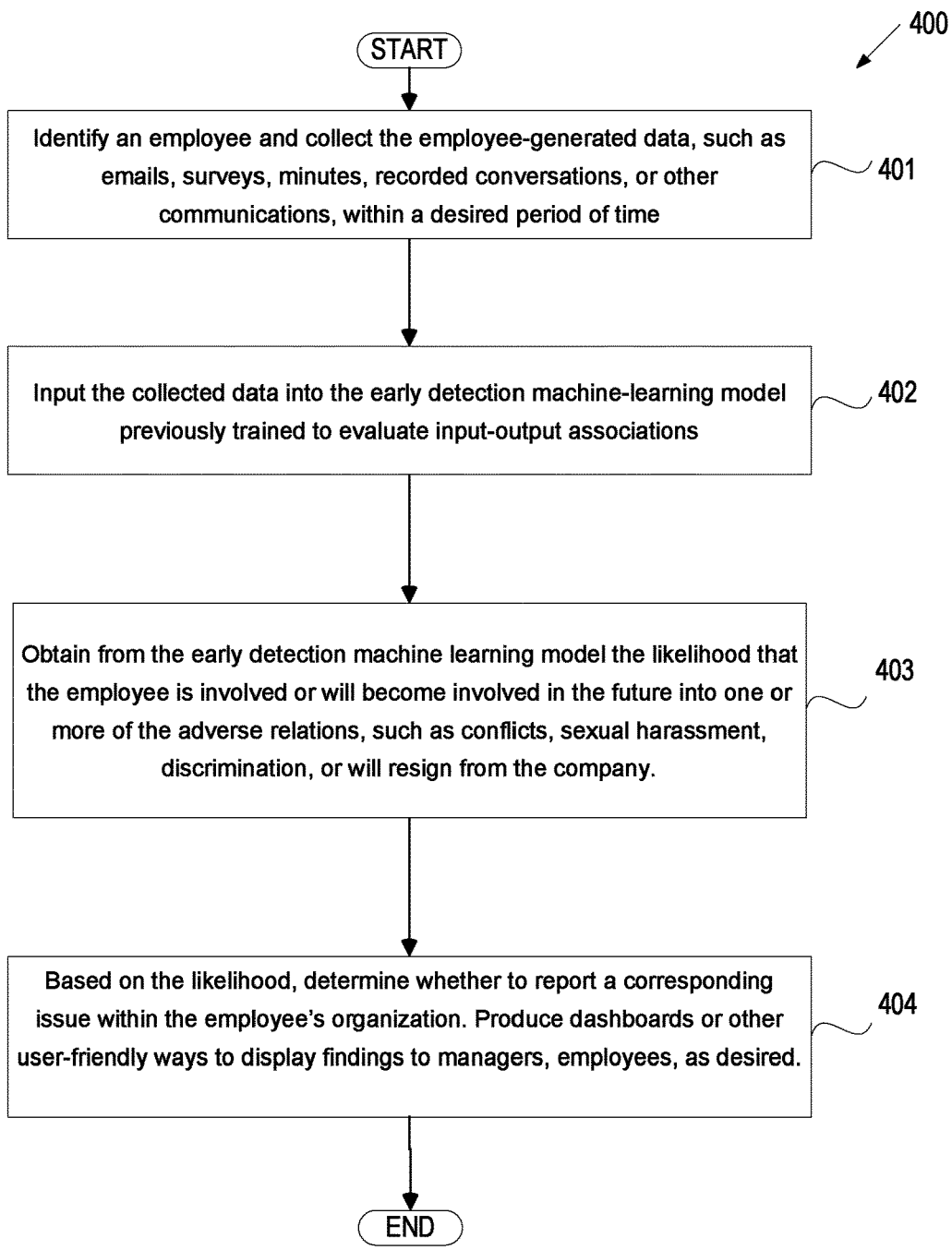
FIG. 4 depicts a flow diagram of an example method of using a trained machine-learning model for early detection of adverse relations and employee resignations.

FIGS. 3-4 depict flow diagrams of example methods 300-400 which may be used in different implementations for predicting a likelihood of the employee's engagement in adverse relations with other employees or the likelihood of the employee resignation. Methods 300-400 may be performed by a computer system that may comprise hardware (e.g., circuitry, dedicated logic, and/or programmable logic), software (e.g., instructions executable on a computer system to perform hardware simulation), or a combination thereof. Methods 300-400 and/or each of its functions, routines, subroutines, or operations may be performed by one or more physical processors of the computer system executing the method. Two or more functions, routines, subroutines, or operations of each of methods 300-400 may be performed in parallel or in an order which may differ from the order described above. In certain implementations, methods 300-400 may be performed by a single processing thread. Alternatively, methods 300-400 may be performed by two or more processing threads, each thread executing one or more individual functions, routines, subroutines, or operations of the method. In an illustrative example, the processing threads implementing methods 300-400 may be synchronized (e.g., using semaphores, critical sections, and/or other thread synchronization mechanisms). Alternatively, the processing threads implementing methods 300-400 may be executed asynchronously with respect to each other. In one example, methods 300-400 may be performed by the processing systems described herein below and illustrated by FIG. 6.

FIG. 3 depicts a flow diagram of an example method 300 of training a machine-learning model for early detection of adverse relations and employee resignations using a training set. After a training set is initialized at block 310, a processing device of the training set generator (for example, the generator 140 of FIG. 1 or the generator 240 of FIG. 2) may generate a training input at block 320. The input may include one or more of the employee-generated data associated with a user, e.g. emails, surveys, or other types of communications. At block 330, the training set generator may generate a target output associated with the user, such as adverse relations labels corresponding to the training input, e.g. labels of conflicts, sexual harassment, discrimination, or occurrences of resignation. By way of example, in a conflict recognition, the training input may be a threatening email message or a series of messages sent over a period of time containing language of gradually increasing hostility. A target output label may be established on the basis of the latter data, e.g. emails, where the existence of the adverse relation is manifest. Additionally, the establishment of the target output may be facilitated by accessing organization's records of complaints, or the remedial or disciplinary action taken by the organization. An assistance of a human operator, e.g. the manager of an employee or a human resources officer may be helpful to establish the target output label. In other instances, the establishment of the target output label can be fully automated. In some implementations, methods of natural language processing may be used.

In historical instances of resignation, a training output may be a recorded decision of the employee to leave the organization, for example, evidenced by a submission of a resignation letter. A training input in the instances of resignation may include various engagement metrics, such as the content, level of engagement, volume of communication inside the organization (including correspondence with supervisors, supervisees, and other co-workers) and outside it (such as communications with clients, customers, suppliers, providers, contractors). A training input may include the response time, such as the time between receiving a request and acknowledging it, or between receiving a request and its execution.

At block 340, the training set generator may generate an association between the training input and the target output. For example, the training input metrics of the volume of correspondence declining with time and increasing response time may be associated with the target output occurrence of a subsequent resignation. In other instances, the training input may contain indications of an increasing tension and/or hostility in email exchanges of an employee with a specific co-employee. Such occurrences may be associated with the target output of a manifest indication of a developed conflict within the email (such as in a later email) chain. In some instances, formation of the input-output association can be assisted by a record of complaints filed by, on behalf, or against the employee. In yet other instances, the training input of sexually-colored communications may be associated with the target output of recorded occurrences of sexual harassment. Algorithms of natural language processing may be used at block 340. At block 350, the generated input, the generated output, and the input-output association may be added to the training set. The training set may be empty so far or contain previously added input-outputs. A training set generator may decide at block 360, whether the training set is sufficient. The decision may be fully automated or a human operator may participate in it. If the decision is that the training set needs to be supplied with more input-output training sets, the blocks 320-350 may be repeated as additional target inputs, target outputs, and input-output associations are generated and added to the training set. Additional input-outputs may correspond to the same employee. Alternatively, additional outputs may correspond to different employees, groups of employees, a specific subset of employees, all employees in a particular division of the organization, or to all employees of the entire organization. As necessary, generated training sets may be task-specific and refer only to employees participating in a particular task or project. For example, training sets may relate only to tasks requiring outside travel with the goal of detecting instances of sexual harassment occurring during such travel. Training sets may be generated using training inputs of only a given kind, such as emails only or surveys only. Alternatively, the training sets may contain a plurality of different input types. Training sets may differ by how far into the past the historical data reach. In some instances, training sets may be exhaustive of all data available to the training set generator. In other instances, where cost and time are of essence, the data available to the training set generator may be limited, as appropriate. For example, training sets may be limited to only communications within the organization or, vice versa, only to the communications with organization's clients or other external correspondents, such as trading partners, suppliers, purchasers, government entities, etc.

Once one or more training sets are generated, they can be used at block 370 to train a machine learning model to detect early signs of adverse relations or the likelihood of resignation. A person skilled in the art would recognize a variety of machine-learning algorithms that can be used to train the early detection model, such as Decision Trees, Bayesian Classifiers, Least Squares Regressions, Logistic Regressions, Support Vector Machines, Error-Correcting Ensemble Methods, Clustering Algorithms, Independent Component Analyses, Neural Networks, and many others. The algorithms may use various feature extraction steps. The algorithms may use natural language processing methods. In some embodiments, linguistic analyzers may be used to extract specific words and word chains that can signal the onset, development, or existence of an adverse relation or disengagement of the employee.

FIG. 4 depicts a flow diagram of an example method of using a trained machine-learning model for early detection of adverse relations and employee resignations. Once the machine-learning model is trained with an amount of training sets sufficient for a particular early detection task, the model may be used in a manner, illustrated by way of example in FIG. 4. Method 400 may begin at block 401 by identifying a specific employee or a group of employees and accessing the employee-related data stored in one or more data stores. The identification can be requested by a human resources department, by managerial personnel, by the organization's security, or by any other staff that may be authorized to make such requests. At block 401, a time frame for the employee-generated input data can be set depending on the specific detection goal. Likewise, the breadth, scope, and content of the employee-generated data can be set at block 401, in some implementations. In various implementations, the training method 300 of the machine-learning algorithm may be performed before a request identifying an employee is made. In other implementations, the training method 300 may be performed after such a request. For example, block 401 may be executed prior to the training method 300, so that the training is tailored for the particular employee. Because the goal at this point is to assess employee relations or job engagement at the contemporaneous time or in the future, at least some of the input data collected during block 401 may be input data not used during the training method 300.

After the data is collected at block 401, it can be input into the early prediction model at block 402. As disclosed above, the early prediction model may have been previously trained in the training phase (e.g., the training method 300) to evaluate the input-output associations. At block 403, the early prediction model determines outputs corresponding to the input data. The outputs are the likelihoods that the employee is involved or will become involved in the future into one or more of the adverse relations, such as conflicts, sexual harassment, discrimination, or that the employee is to resign from the company. The application of the method 400 can be directed at the same employee for whom the training method 300 was performed. An advantage of this may be that the training is tailored to the employee's use of language and style of communications. This, however, may not be necessary or even possible in other situations. In some implementations, the employee may be new and limited amount of the employee-related data may be available. Correspondingly, the training method 300 may be performed for one employee or a group of employees whereas the method 400 may be directed at another employee or a group of employees. In instances of resignations, this second approach may be preferred.

At block 404 the early prediction model may assess the seriousness of the detected adverse situation and make a threshold decision to notify management of the organization, e.g., a supervisor of the employee. A human operator can participate in that decision. In some implementations, the decision can be made in a fully automated manner. Under-the-threshold outputs may be ignored and/or deleted. Alternatively, all outputs may be stored and made available to the authorized users. The likelihoods of various adverse relations and resignations can be presented for viewing in a variety of ways. The output can be a simple numerical score, which may be further supplemented with a time frame. In some implementations, the model may output a first numerical value predicting the likelihood that the employee A is involved (or will become involved) in an adverse relation with other employees. The model may output a second numerical value predicting the likelihood that the employee is to resign within a certain period of time. In some implementations, the model may notify the supervisor of the employee in response to determining that the first numerical value or the second numerical value exceeds a second predetermined threshold value. For example, the model may predict that the employee will become involved in a conflict within the next month with the probability of 75%, and that she will leave the organization within the next 6 month with the probability of 55%. If the model has a set predetermined threshold value of 50%, the model may notify the supervisor about both probabilities. If the model has a threshold of 70%, it may notify the supervisor about the 75% probability of the employee being involved in an adverse relation, but not notify the supervisor about the likelihood of resignation. In some implementations, the adverse relations threshold and the resignation threshold may be set at different predetermined levels. In other embodiments, the output can take the form of discrete levels of likelihood, such as "very likely," "likely," "possibly," "unlikely." Alternatively, the output can be in the form of continuous color-coded graphics embedded in performance dashboards. Dashboards or other interfaces can display a plurality of metrics of employee relations and/or job satisfaction. For example, the dashboards may display the employee response time, the number of assignments the employee receives or volunteers for, the number of the projects the employee is behind on, the amount of meetings and conference calls the employee takes part in, the amount of time the employee spends mentoring others, and the like. Dashboards can be made available to supervisors, managers, human resources, security personnel, or other authorized users. Dashboards can be made accessible by employees. In some instances it may be desirable to allow employees access only some of the outputs generated by the early prediction model. Employee-accessible dashboards or interfaces may include comments, recommendations, or suggestions with the purpose of improving their conduct, experiences and/or the employee job satisfaction. If early indications of a conflict are projected by the model, the employee may be advised about how to avoid furthering the conflict, possibly including conflict-resolution training. If the model detects the likelihood that the employee is involved in a sexually harassing or discriminatory behavior, the employee may be directed to a proper anti-discriminatory training.

Figure 5:
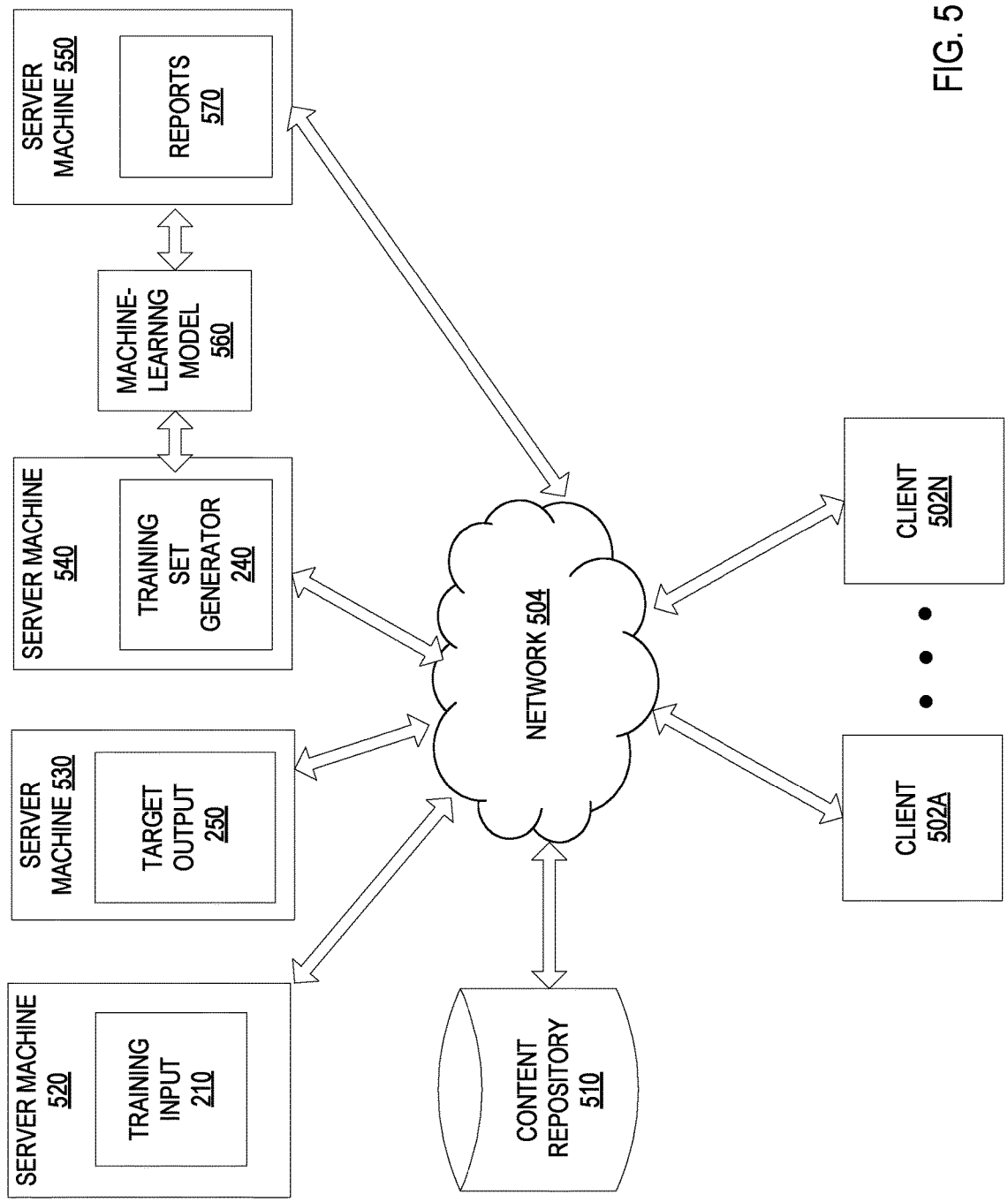
FIG. 5 illustrates an exemplary system architecture for implementation of a machine-learning model capable of predicting negative employment actions, in accordance with one implementation of the present disclosure

FIG. 5 illustrates an exemplary system architecture 500 for implementation of a machine-learning model capable of predicting negative employment actions, in accordance with one implementation of the present disclosure. The system architecture 500 includes a server machine 520, one or more server machines 530 through 550, a content repository 510 and client machines 502A-502N connected to a network 504. Network 504 may be a public network (e.g., the Internet), a private network (e.g., a local area network (LAN) or wide area network (WAN)), or a combination thereof.

The client machines 502A-502N may be personal computers (PCs), laptops, mobile phones, tablet computers, set top boxes, televisions, video game consoles, digital assistants or any other computing devices. The client machines 502A-502N may run an operating system (OS) that manages hardware and software of the client machines 502A-502N. In one implementation, the client machines 502A-502N may upload videos to the web server for storage and/or processing.

Server machine 520 may be a rackmount server, a router computer, a personal computer, a portable digital assistant, a mobile phone, a laptop computer, a tablet computer, a camera, a video camera, a netbook, a desktop computer, a media center, or any combination of the above. Server machine 520 may include training input data 210 that may be uploaded by client machines 502A-502N (e.g., via a webpage, via an application, etc.).

Content repository 510 may be a persistent storage that is capable of storing content items as well as data structures to tag, organize, and index the media items. Content repository 510 may be hosted by one or more storage devices, such as main memory, magnetic or optical storage based disks, tapes or hard drives, NAS, SAN, and so forth. In some implementations, content repository 510 may be a network-attached file server, while in other embodiments content repository 510 may be some other type of persistent storage such as an object-oriented database, a relational database, and so forth, that may be hosted by the server machine 520 or one or more different machines coupled to the server machine 520 via the network 504. The content repository 510 may store some of the employee-generated input data. In some implementations, the content repository 510 may store some of the training data. In some implementations, content repository 510 may be provided by a third-party service, while in some other implementations content repository 510 may be maintained by the same entity maintaining server machine 520.

In some implementations, server machine 530 may store training output 250, server machine 540 may store training set generator 240 capable of generating training data (e.g., a set of training inputs and target outputs) to train a machine learning model. Some operations of training set generator 240 are described above with respect to FIGS. 1 and 2.

The training set generator 240 may map the training input to the target output and provide the results to the machine learning model 560. The trained machine learning model 560 may be located on any of the server machines 510-550 and receive employee-generated data from the content repository 510 and/or any of the client machines 502A-502N. The machine learning model 560 may generate reports (and/or dashboards) 570 and store them on one of the server machines, for example on server 560.

It should be noted that in some other implementations, the functions of server machines 520-550 may be provided by a fewer number of machines. For example, in some implementations server machines 530 and 540 may be integrated into a single machine, while in some other implementations server machines 530, 540, and 550 may be integrated into a single machine. In addition, in some implementations one or more of server machines 520-550 may be integrated into the content sharing platform.

In general, functions described in one implementation as being performed by the content item sharing platform, server machine 520, server machine 530, server machine 540, and/or server machine 550 can also be performed on the client devices 502A through 502N in other implementations, if appropriate. In addition, the functionality attributed to a particular component can be performed by different or multiple components operating together. The content sharing platform, server machine 520, server machine 530, server machine 540, and/or server machine 550 can also be accessed as a service provided to other systems or devices through appropriate application programming interfaces, and thus is not limited to use in websites.

Figure 6:
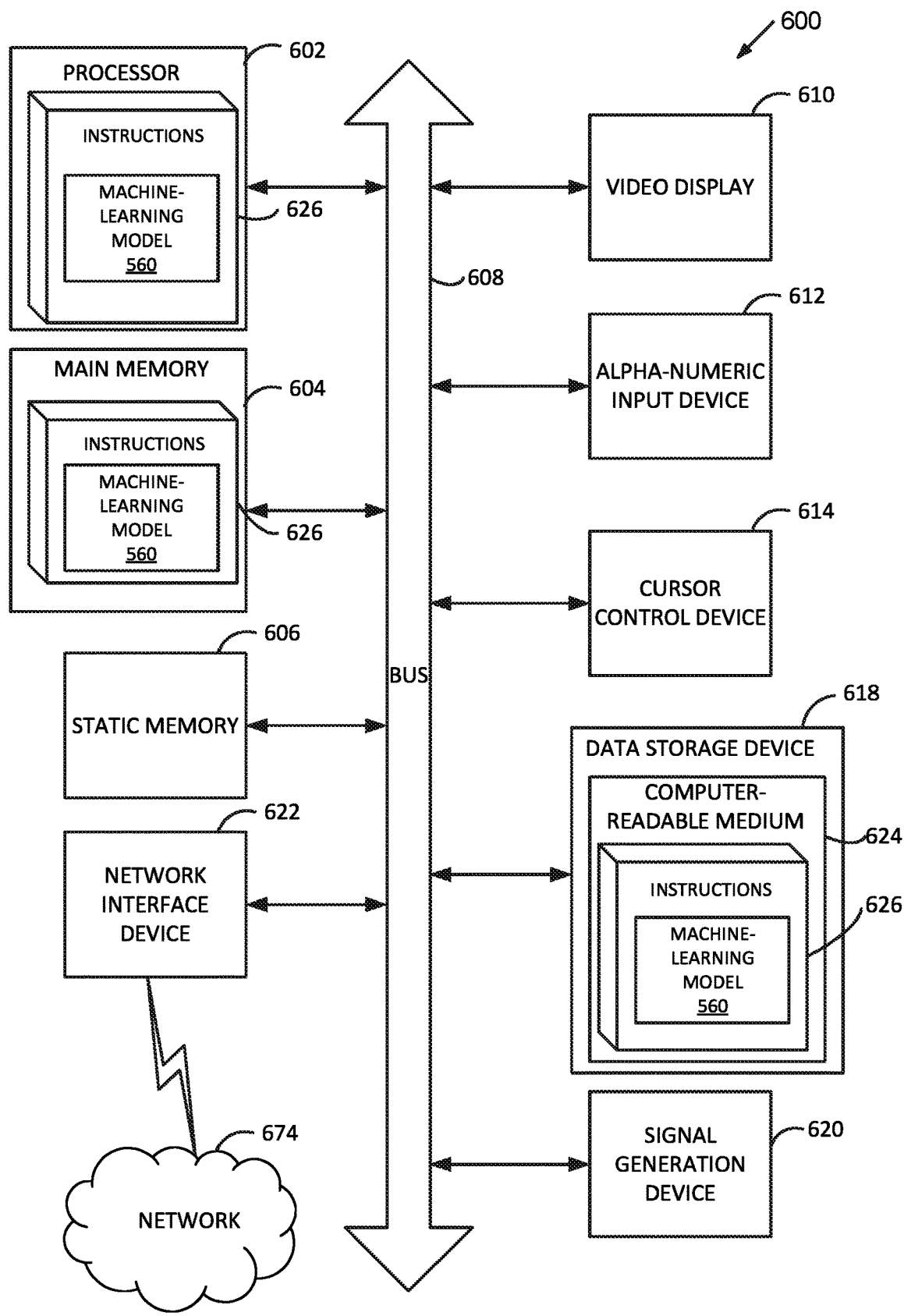
FIG. 6 is an example computer system in which aspects of the present disclosure can be implemented.

FIG. 6 depicts a block diagram of a computer system 600 operating in accordance with one or more aspects of the present disclosure. In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 which may store instructions 626 encoding any one or more of the methods or functions described herein, including instructions to implement a model of detection of adverse employee relations and potential resignation, in particular, for implementing methods 300 and 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "detecting," "determining," "initiating," "creating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the method and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    accessing, by a processing device, employee-generated data stored in one or more data stores, the employee-generated data being generated by an employee in a course of employment with an organization;
    generating, by the processing device and based on the accessed employee-generated data, an input into a machine learning model, the input comprising at least one of emails, surveys, minutes, or records of conversations by the employee; and
    applying, by the processing device, the machine learning model to the generated input to obtain a first numerical value characterizing a probability that the employee is engaged in an adverse relation with one or more other employees of the organization, wherein applying the machine learning model comprises extracting, based on one or more natural language processing algorithms, one or more features of the generated input, and
    wherein the machine learning model is trained by a training set generator performing operations of:
    generating a first training input comprising words that indicate a development of an adverse historical relation between two or more employees;
    identifying a target output comprising a developed adverse historical relation between the two or more employees; and
    generating an association between the first training input and the target output.

2. The method of claim 1, wherein the adverse relation with the one or more other employees relates to at least one of an instance of personal conflict, an instance of sexual harassment, or an instance of discrimination.

3. The method of claim 1, wherein applying the machine learning model to the generated input is further to obtain a second numerical value characterizing a probability that the employee is to resign from the organization within a period of time.

4. The method of claim 3, wherein the operations of the training set generator further comprise:
    generating a second training input;
    identifying, by the training set generator, an occurrence of resignation; and
    forming, by the training set generator, an association between the second training input and the occurrence of resignation.

5. The method of claim 1, further comprising:
    generating, based on the employee-generated data associated with the employee, a plurality of metrics associated with a job satisfaction of the employee;
    creating a dashboard displaying the plurality of metrics associated with the job satisfaction of the employee; and
    providing the dashboard to a supervisor of the employee.

6. The method of claim 1, further comprising:
notifying a supervisor of the employee in response to determining that the first numerical value exceeds a predetermined threshold value.

7. A system comprising:
a memory; and
a processing device, operatively coupled to the memory, the processing device to
access employee-generated data stored in one or more data stores, the employee-generated data being generated by an employee in a course of employment with an organization;
generate, based on the accessed employee-generated data, an input into a machine learning model, the input comprising at least one of emails, surveys, minutes, or records of conversations by the employee; and
apply, the machine learning model to the generated input to output a first numerical value characterizing a probability that the employee is engaged in an adverse relation with one or more other employees of the organization, wherein to apply the machine learning model the processing device is to extract, based on one or more natural language processing algorithms, one or more features of the generated input, and
wherein the machine learning model is trained by a training set generator, the training set generator to:
generate a first training input comprising words that indicate a development of an adverse historical relation between two or more employees;
identify a target output comprising a developed adverse historical relation between the two or more employees; and
generate an association between the first training input and the target output.

8. The system of claim 7, wherein the adverse relation with the one or more other employees relates to at least one of an instance of personal conflict, an instance of sexual harassment, or an instance of discrimination.

9. The system of claim 7, wherein the machine learning model is further to obtain a second numerical value characterizing a probability that the employee is to resign from the organization within a period of time.

10. The system of claim 9, wherein the training set generator is further to:
generate a second training input;
identify an occurrence of resignation; and
form an association between the second training input and the occurrence of resignation.

11. The system of claim 7, wherein the processing device is further to:
generate, based on the employee-generated data associated with the employee, a plurality of metrics associated with a job satisfaction of the employee;
create a dashboard displaying the plurality of metrics associated with the job satisfaction of the employee; and
provide the dashboard to a supervisor of the employee.

12. The system of claim 7, wherein the processing device is further to:
notify a supervisor of the employee in response to determining that the first numerical value exceeds a predetermined threshold value.

13. A non-transitory computer-readable storage medium storing instructions which, when executed by a processing device, cause the processing device to:
access employee-generated data stored in one or more data stores, the employee-generated data being generated by an employee in a course of employment with an organization;
generate, based on the accessed employee-generated data, an input into a machine learning model, the input comprising at least one of emails, surveys, minutes, or records of conversations by the employee; and
apply, the machine learning model to the generated input to output a first numerical value characterizing a probability that the employee is engaged in an adverse relation with one or more other employees of the organization, wherein to apply the machine learning model the processing device is to extract, based on one or more natural language processing algorithms, one or more features of the generated input, and wherein the machine learning model is trained by a training set generator, the training set generator to:
generate a first training input comprising words that indicate a development of an adverse historical relation between two or more employees;
identify a target output comprising a developed adverse historical relation between the two or more employees; and
generate an association between the first training input and the target output.

14. The non-transitory computer-readable storage medium of claim 13, wherein the adverse relation with the one or more other employees relates to at least one of an instance of personal conflict, an instance of sexual harassment, or an instance of discrimination.

15. The non-transitory computer-readable storage medium of claim 13, wherein the machine learning model is further to obtain a second numerical value characterizing a probability that the employee is to resign from the organization within a period of time.

16. The non-transitory computer-readable storage medium of claim 15, wherein to train the machine learning model the training set generator is further to:
generate a second training input;
identify an occurrence of resignation; and
form an association between the second training input and the occurrence of resignation.

17. The non-transitory computer-readable storage medium of claim 13, wherein the instructions further cause the processing device to:
notify a supervisor of the employee in response to determining that the first numerical value exceeds a predetermined threshold value.

18. The method of claim 1, wherein the machine learning model comprises a neural network.

19. The system of claim 7, wherein the machine learning model comprises a neural network.

20. The computer-readable medium of claim 13, wherein the machine learning model comprises a neural network.

* * * * *